J. GOLDER.
Corn-Planter.
No 43,682. Patented Aug. 2, 1864.
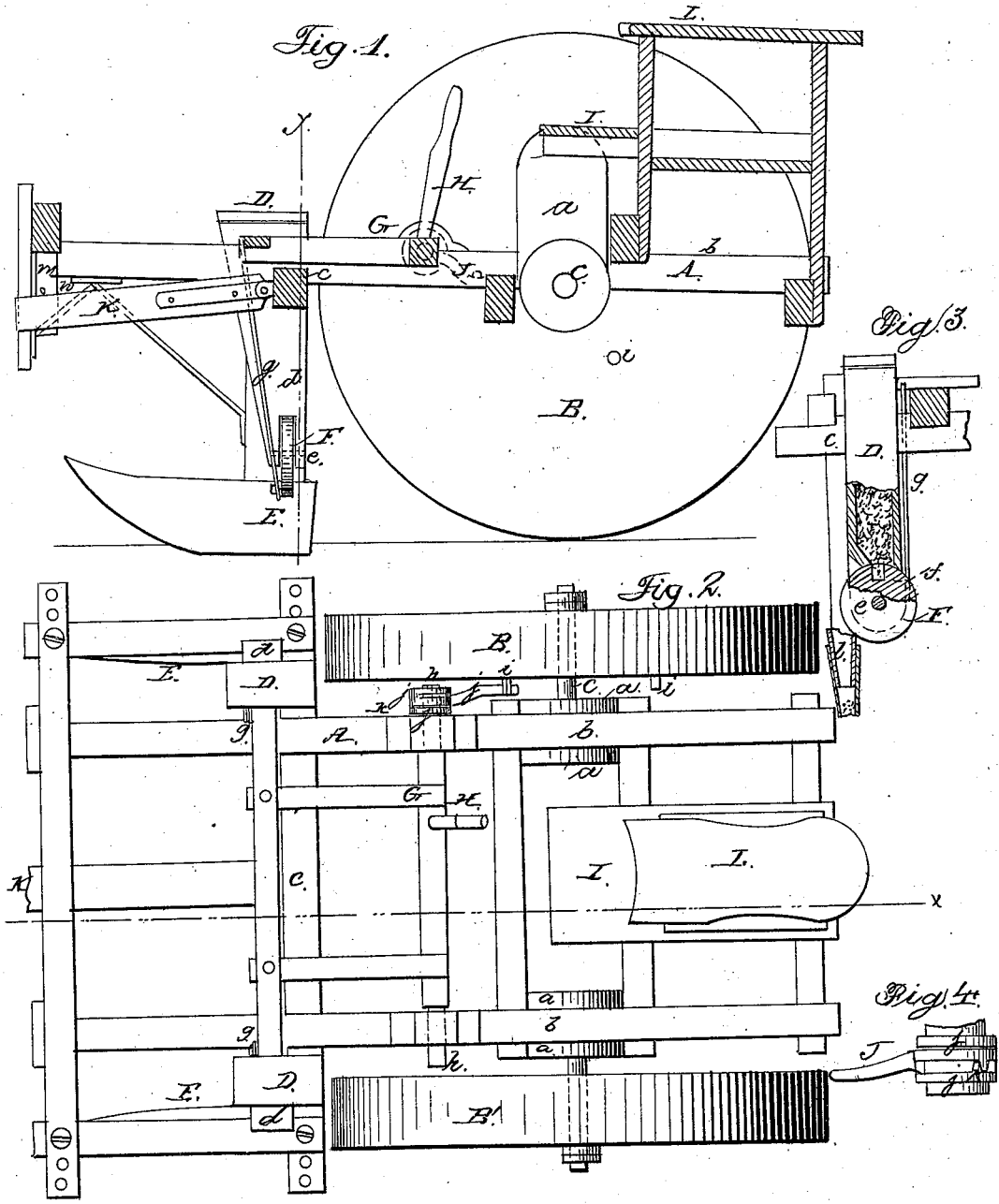
WITNESSES:
J.W. Coombs
G.W. Reed
INVENTOR:
Joseph Golder
per Munn & Co.
Attorneys

UNITED STATES PATENT OFFICE.

JOSEPH GOLDER, OF STERLING, ILLINOIS.

CORN-PLANTER.

Specification forming part of Letters Patent No. 43,682, dated August 2, 1864.

*To all whom it may concern:*

Be it known that I, JOSEPH GOLDER, of Sterling, in the county of Whiteside and State of Illinois, have invented a new and Improved Corn-Planter; and I do hereby declare that the following is a full, clear, and exact description of the same, reference being had to the accompanying drawings, forming a part of this specification, in which—

Figure 1 represents a longitudinal vertical section of my invention, the line $x\,x$, Fig. 2, indicating the plane of section. Fig. 2 is a plan or top view of the same. Fig. 3 is a detached transverse vertical section of the dropping mechanism, the plane of section being indicated by the line $y\,y$, Fig. 1. Fig. 4 is a detached plan of the tappet on the dropping-lever in a larger scale than the previous figures.

Similar letters of reference in the several views indicate corresponding parts.

This invention relates to an improvement in that class of corn-planters which make their own furrows and plant two rows of seed simultaneously by one operation of the distributing mechanism, said mechanism being so constructed that it can be operated either by hand or automatically by the action of the machine.

The nature of my invention and its peculiar advantages will be readily understood from the following description:

A represents a frame made of wood or any other suitable material, and supported by two wheels, B B', which rotate on axles C. These axles have their bearings in uprights $a$, which are adjustable in a vertical direction on the longitudinal timbers $b$ of the frame A, and by shifting them up or down the frame A, with all its appendages, can be raised from or lowered to the ground at pleasure.

D D are the hopper-boxes, which are long and narrow, and secured to the cross-bar $c$, of the frame in front of the wheels B B, and from these hopper-boxes the seed is discharged into furrows opened by the sleigh-runner-shaped shoes E. These shoes are attached to standards $d$, and they are situated directly in front of the middle of the wheels, so that said wheels in following the furrows will be able to cover the seed that may have been dropped by the action of the machine.

The hoppers extend down on the inside of the standards $d$, and the seed is discharged from them by the action of disks F. These disks have their fulcrums on pivots $e$, which are secured in the bottom ends of the hopper, and they are provided each with one seed-cell, $f$, which may be made adjustable or not, according to circumstances. An oscillating motion is imparted to said disks by the action of a rocking frame, G, which connects with them by rods $g$. The frame G rocks on gudgeons $h$, in suitable boxes, $i$, which are secured to the frame A, and it is operated either by a hand-lever, H, from the dropper's seat I or by the action of a series of studs, $i$, projecting from the inside of the driving-wheel B and acting on a tappet, J, which is secured to the prolongation of one of the gudgeons $h$ of the rocking frame G. The tappet J is attached loosely to said gudgeon between two rings, $j\,j$, which are driven firmly on the gudgeon and the hub of the tappet, and said rings are provided with projections $k$, which are in such relative position toward each other that in turning the driving-wheel backward the tappet turns up independent of the rocking frame; but in turning the driving-wheel forward the tappet is rendered rigid with the gudgeon, and an oscillating motion is imparted to the rocking frame. By this arrangement injury to the working parts of the machine in turning or backing is prevented.

The seed on being discharged from the seed-cells in the oscillating disks F passes through tubes $l$ down to the ground. These tubes are secured to the rear edges of the standards $d$, between the two wings of the shoes E. After the seed has been deposited in the ground it is covered by the action of the wheels B B'.

The draft-pole K is hinged to the cross-bar $c$ in the middle between the hoppers, and it is adjusted in a stirrup, $m$, which is secured to the front cross-bar of the frame A, and provided with one or more sets of hobs, $n$. By depressing the draft-pole in the stirrup the frame A is raised, and, if desired, the shoes can be thrown completely out of the ground, and by raising the draft-pole the frame A is lowered, and the depth to which the shoes cut in the ground can thus be adjusted.

The machine requires two men to work it— one, the dropper, who occupies the seat I, and the other, the driver, who occupies the seat L. If the seed-dropping mechanism is operated, however, by the action of the studs $i$ on the tappet J, the dropper can be dispensed with.

What I claim as new, and desire to secure by Letters Patent, is—

The combination of the rocking frame G, tappet J, rings $j\ j$, projections $k\ k$, studs $i\ i$, driving-wheel B, hoppers D, and oscillating disks F, located near the ground at the bottom of the said hoppers, all the said parts being constructed, arranged, and operating as and for the purposes herein specified.

JOSEPH GOLDER.

Witnesses:
J. S. STAOER,
FREDK. SACKETT.